United States Patent [19]
Antoun

[11] Patent Number: 5,879,545
[45] Date of Patent: Mar. 9, 1999

[54] CYCLONIC FILTER ASSEMBLY

[76] Inventor: Gregory S. Antoun, 25 W. High St., Union City, Pa. 16438

[21] Appl. No.: 851,339

[22] Filed: May 5, 1997

[51] Int. Cl.$^6$ .......................... B01D 21/26; B01D 29/00; B01D 35/14

[52] U.S. Cl. .......................... 210/90; 210/232; 210/295; 210/304; 210/305; 210/512.1; 209/717; 209/721; 55/459.1; 55/459.5; 55/337; 96/421

[58] Field of Search ..................... 210/232, 295, 210/304, 305, 307, 308, 309, 512.1, 90; 209/717, 721; 55/459.1, 459.5, 337; 96/421

[56] References Cited

U.S. PATENT DOCUMENTS

| | | |
|---|---|---|
| 1,107,485 | 8/1914 | Bowser . |
| 1,919,653 | 7/1933 | Hill . |
| 2,005,770 | 6/1935 | Bleser . |
| 3,061,098 | 10/1962 | Brezinski . |
| 3,259,246 | 7/1966 | Stavenger . |
| 3,285,422 | 11/1966 | Wiley . |
| 3,529,724 | 9/1970 | Maciula et al. . |
| 3,698,555 | 10/1972 | Conner . |
| 4,230,581 | 10/1980 | Beazley . |
| 4,278,534 | 7/1981 | Jakobson . |
| 4,298,465 | 11/1981 | Druffel . |
| 4,305,825 | 12/1981 | Laval, Jr. . |
| 4,688,650 | 9/1987 | Hayatdavoudi et al. . |
| 4,690,759 | 9/1987 | Mandy . |
| 4,710,284 | 12/1987 | Amit . |
| 4,906,264 | 3/1990 | Szymaszek et al. . |
| 4,964,994 | 10/1990 | Wakley et al. ........................ 210/512.1 |
| 5,330,641 | 7/1994 | Cattani . |
| 5,391,294 | 2/1995 | Mercier . |
| 5,478,484 | 12/1995 | Michaluk . |

FOREIGN PATENT DOCUMENTS

| | | |
|---|---|---|
| 229236 | 8/1963 | Austria . |
| 1108186 | 6/1961 | Germany . |
| 2708135 (A1) | 8/1978 | Germany . |
| 3736504 (C1) | 3/1989 | Germany . |
| 53-134278 | 11/1978 | Japan . |
| 1-17726 (B2) | 3/1989 | Japan . |
| 631217 | 11/1978 | U.S.S.R. . |
| 1599103 | 10/1990 | U.S.S.R. . |
| 885535 | 12/1961 | United Kingdom . |

Primary Examiner—David A. Reifsnyder
Attorney, Agent, or Firm—Richard C. Litman

[57] ABSTRACT

A compact cyclonic filter assembly used for separating unwanted debris from a fluid. The cyclonic filter assembly uses the centrifugal forces to separate large pieces of debris from the fluid and a filter to separate the remaining unwanted debris from the fluid. The present invention can be contained in a compact single housing which may be disassembled for easy cleaning and replacement of parts. The cyclonic filter assembly of the present invention has a vertically oriented cylindrical tube which receives a tangential injection of the debris laden fluid. The tangential injection causes the fluid to circulate around a cylindrical vortex finder which is inside of and coaxial with the tube. The centrifugal forces acting on the debris causes the debris to move outward away from the center of the vortex. The vortex finder has an opening which pulls in the relatively clean fluid near the center of the vortex while the debris laden fluid settles into a collection chamber below the cylindrical tube. The vortex finder carries the relatively clean fluid to a filtration chamber which preferably encircles the cylindrical tube. The filtration chamber houses a filter element which is used to extract the remaining unwanted debris from the fluid before it exits the cyclonic filter assembly. The filter element used in the present invention is a standard filter bag that not only acts as a filter element in the filtration chamber, but also extends into the collection chamber to act as a debris collection bag.

19 Claims, 2 Drawing Sheets

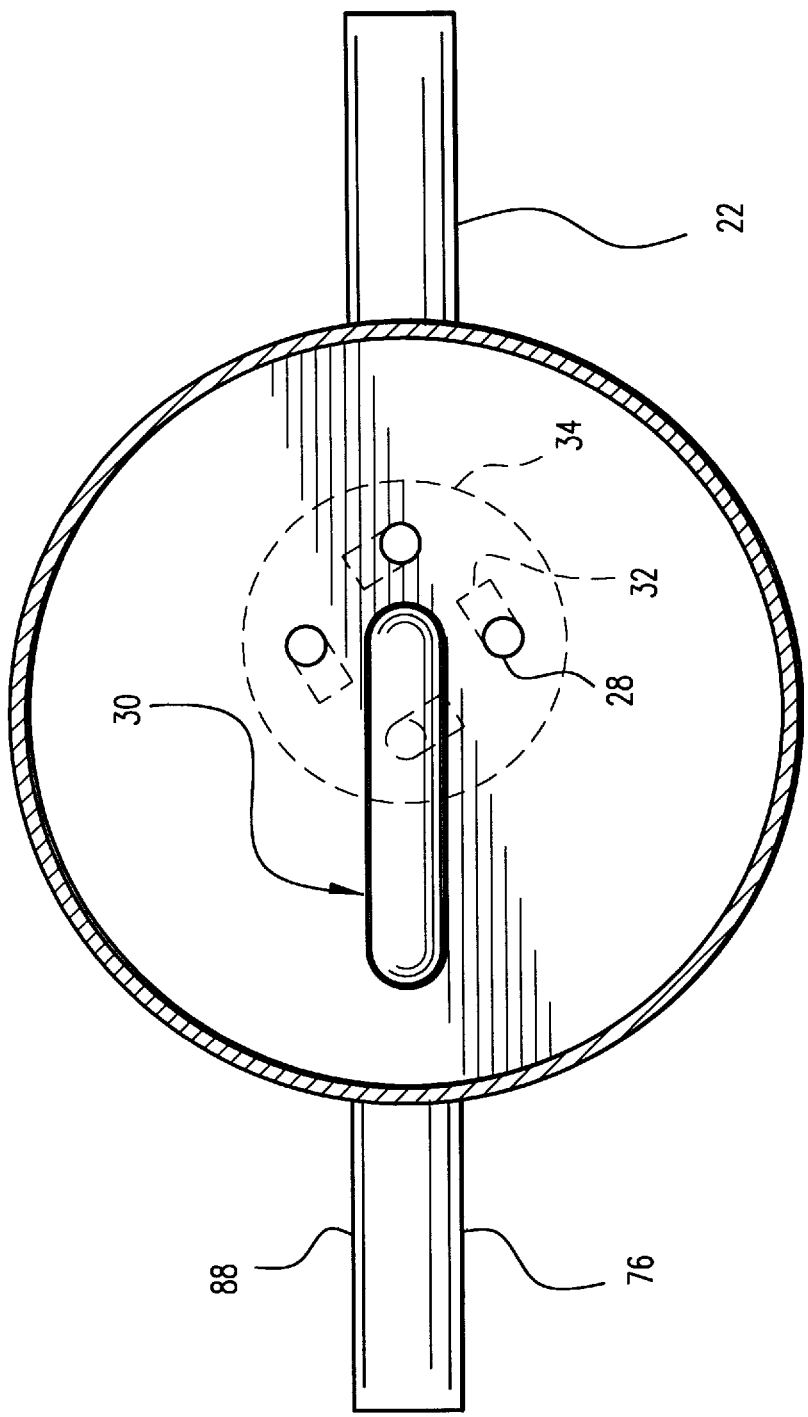

CYCLONIC FILTER ASSEMBLY

BACKGROUND OF THE INVENTION

1. Field of the Invention

The present invention is a compact cyclonic filter assembly used for separating unwanted debris from a fluid. The cyclonic filter assembly uses centrifugal forces to separate large pieces of debris from the fluid and a filter to separate the remaining unwanted debris from the fluid.

2. Description of Related Art

Cyclonic separators are commonly used for separating unwanted debris from fluids by using centrifugal force. The fluid is typically tangentially injected into the cyclonic separator such that a circular flow is set up. The centrifugal forces act on the heavier debris, forcing the debris toward the perimeter of the separation chamber. The substantially debris-free fluid near the center of the vortex is extracted and recirculated, while the debris is collected and discarded.

Some cyclonic filters are used in a component system in combination with a separate filter housing and a separate sludge receiver housing. These separate housings require a larger amount of piping and each require a separate filter basket and filter bag in order to operate correctly. These component systems require cleaning and changing of several housings and filter bags which increases down time and increases the amount of inventory needed to maintain the system in working order. These systems also take up a lot of valuable space.

Currently, there is a need for a compact filter assembly which uses centrifugal forces to separate large pieces of debris from a debris laden fluid and a filter element to separate the remaining unwanted debris from the fluid. The filter assembly should be capable of easily disassembling for cleaning and replacement of parts. Also, the filter assembly should use a single standard filter bag as both a filter element in the filtration chamber, and a debris collection bag in the collection chamber, therefore making the filter assembly inexpensive to maintain and easy to clean.

The following publications describe cyclonic separators that separate unwanted debris from fluids by extracting substantially debris-free fluid from the vortex and collecting and discarding the unwanted debris: U.S. Pat. No. 1,919,653, issued on Jul. 25, 1933, to Raymond A. Hill; U.S. Pat. No. 3,259,246, issued on Jul. 5, 1966, to Paul L. Stavenger; U.S. Pat. No. 3,285,422, issued on Nov. 15, 1966, to William R. Wiley; U.S. Pat. No. 4,305,825, issued on Dec. 15, 1981, to Claude C. Laval, Jr.; U.S. Pat. No. 4,688,650, issued on Aug. 25, 1987, to Asadollah Hayatdavoudi et al.; U.S. Pat. No. 5,330,641, issued on Jul. 19, 1994, to Ennio Cattani; U.S. Pat. No. 5,391,294, issued on Feb. 21, 1995, to Dominique Mercier. The above listed publications do not describe a compact filter assembly which uses centrifugal forces to separate large pieces of debris from a debris laden fluid and a filter element to separate the remaining unwanted debris from the fluid.

The following publications describe cyclonic separators that separate unwanted debris from fluids by extracting substantially debris-free fluid from the vortex and by further filtering the fluid using a filter element: U.S. Pat. No. 1,107,485, issued on Aug. 18, 1914, to Allen A. Bowser; U.S. Pat. No. 3,061,098, issued on Oct. 30, 1962, to Jerome P. Brezinski; U.S. Pat. No. 3,529,724, issued on Sep. 22, 1970, to L. Andrew Maciula et al.; U.S. Pat. No. 3,698,555, issued on Oct. 17, 1972, to John R. Conner; U.S. Pat. No. 4,298,465, issued on Nov. 3, 1981, to James R. Druffel; U.S. Pat. No. 4,690,759, issued on Sep. 1, 1987, to Zoltan A. Mandy; U.S. Pat. No. 5,478,484, issued on Dec. 26, 1995, to Peter G. Michaluk; United Kingdom Patent Application Number 885,535, published on Dec. 28, 1961; Austrian Patent Application Number 229,236, published on Aug. 26, 1963; Soviet Union Patent Application Number 631,217, published on Nov. 20, 1978.

None of the above listed publications describe a filter assembly capable of using a single standard filter bag as both a filter element in the filtration chamber and a debris collection bag in the collection chamber, therefore making the filter assembly inexpensive to maintain and easy to clean. None of the above inventions and patents, taken either singularly or in combination, is seen to describe the instant invention as claimed. Thus a cyclonic filter assembly solving the aforementioned problems is desired.

SUMMARY OF THE INVENTION

The present invention is a compact cyclonic filter assembly used for separating unwanted debris from a fluid. The cyclonic filter assembly uses the centrifugal forces to separate large pieces of debris from the fluid and a filter to separate the remaining unwanted debris from the fluid. The present invention can be contained in a compact unit which may be quickly disassembled for easy cleaning and replacement of parts.

The cyclonic filter assembly of the present invention has a typically vertically oriented cylindrical tube which receives a tangential injection of the debris laden fluid. The tangential injection causes the fluid to circulate around a cylindrical vortex finder which is inside of and coaxial with the tube. The centrifugal forces acting on the debris causes the debris to move outward away from the center of the vortex. The vortex finder has an opening which pulls in the relatively clean fluid near the center of the vortex while the debris laden fluid settles into a collection chamber below the cylindrical tube.

The vortex finder carries the relatively clean fluid to a filtration chamber. The filtration chamber houses a filter element which is used to extract the remaining unwanted debris from the fluid before it exits the cyclonic filter assembly. In the preferred embodiment of the present invention the filtration chamber encircles the cylindrical tube in order to create a compact and effective filter unit. The filter element used in the present invention is a standard filter bag that not only acts as a filter element in the filtration chamber, but also extends into the collection chamber to act as a debris collection bag.

Accordingly, it is a principal object of the invention to provide a filter assembly which uses centrifugal forces to separate large pieces of debris from a debris laden fluid and a filter element to separate the remaining unwanted debris from the fluid.

It is another object of the invention to provide a filter assembly which is contained in a compact unit.

It is a further object of the invention to provide a filter assembly which may be easily disassembled for cleaning and replacement of parts.

Still another object of the invention is to provide a filter assembly that is inexpensive to maintain and easy to clean because it uses a single standard filter bag as both a filter element in the filtration chamber, and a debris collection bag in the collection chamber.

It is an object of the invention to provide improved elements and arrangements thereof in a cyclonic filter assembly for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a top, cross-sectional view of the inlet chamber according to the present invention showing the orientation of the inlet ports.

Similar reference characters denote corresponding features consistently throughout the attached drawings.

DETAILED DESCRIPTION OF THE PREFERRED EMBODIMENT

Figure 1:
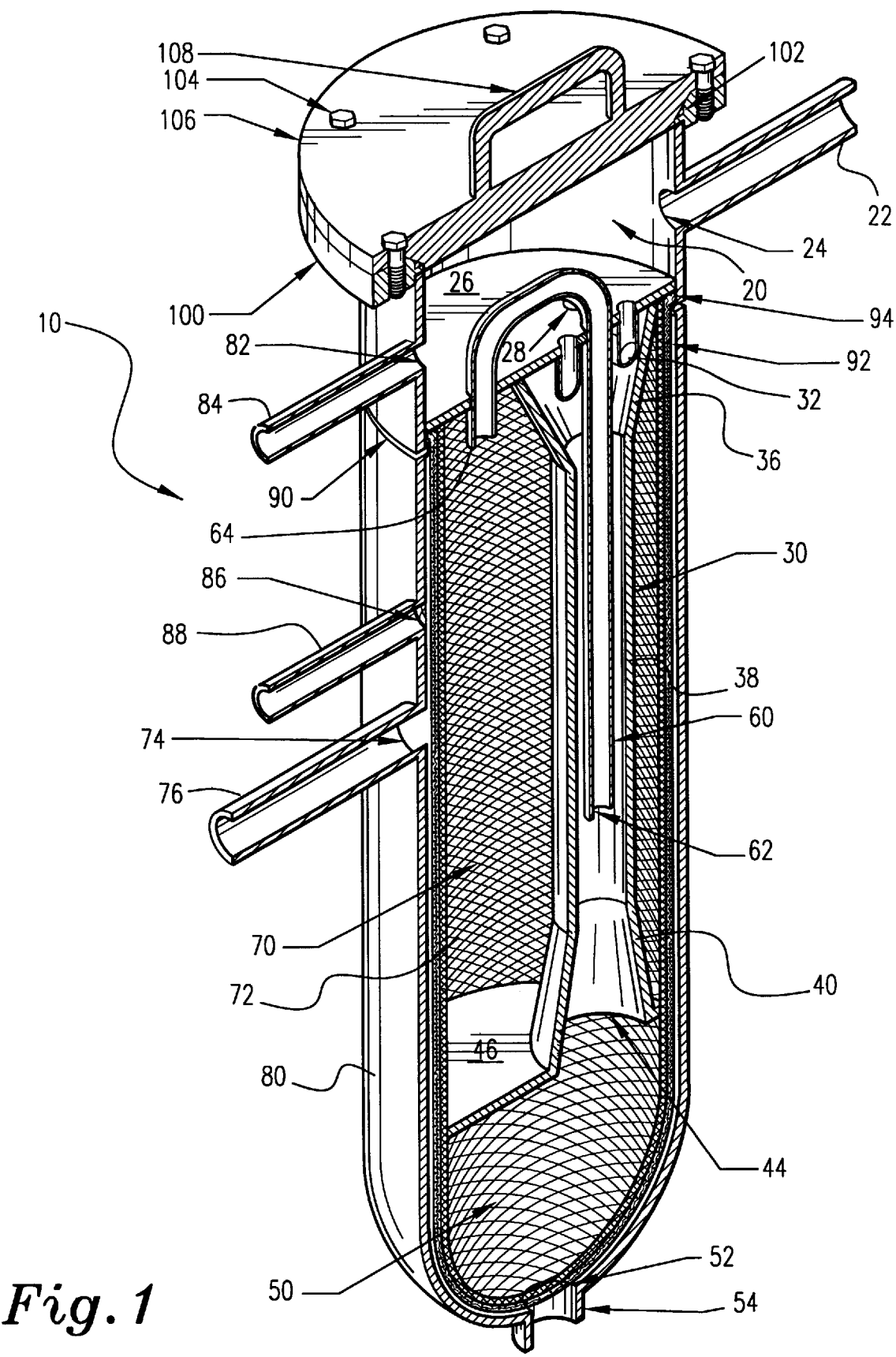
FIG. 1 is a cross-sectional, perspective view of a cyclonic filter assembly according to the present invention.

The present invention 10 is a compact cyclonic filter assembly used for separating unwanted debris from a fluid. The cyclonic filter assembly uses the centrifugal forces to separate large pieces of debris from the fluid and a filter element 72 to separate the remaining unwanted debris from the fluid. The present invention is preferably contained in a compact unit which may be quickly disassembled for easy cleaning and replacement of parts.

Referring to FIGS. 1 and 2, the preferred embodiment of the cyclonic filter assembly 10 of the present invention includes an inlet chamber 20 which receives debris laden fluid from an upstream inlet pipe 22. The inlet pipe 22 carries fluid into the inlet chamber through an opening 24. The inlet chamber 20 is substantially separated from the remainder of the filter assembly by a dividing wall 26. The inlet chamber 20 may include an opening 82 and a pipe 84 for installing a pressure gauge. The dividing wall 26 has several holes 28 which allow the fluid to travel from the inlet chamber 20 to the centrifugal separation chamber 30.

The centrifugal separation chamber 30 includes a tapered section 36 near the inlet ports 32, a cylindrical tube 38, and a tapered section 40. Alternatively, the centrifugal separation chamber 30 could also include a cylindrical section (not shown) located between the dividing wall 26 and the tapered section 36 and a second cylindrical section (not shown) located between the tapered section 40 and dividing wall 46. As a second alternative, the centrifugal separation chamber 30 could merely consist of a tapered section 36 near the inlet ports, and a cylindrical tube 38 which is connected to hole 44.

The cyclonic filter assembly 10 is typically installed such that the centrifugal separation chamber 30 is vertically oriented. Preferably there are four inlet ports 32, as seen in FIG. 2, which are oriented such that they inject debris laden fluid in a substantially tangential direction within the centrifugal separation chamber 30. The tangential injection causes the fluid to circulate around the centrifugal separation chamber 30.

As the fluid moves downward through tapered section 36, the reduction in cross-sectional area causes the fluid to rotate faster. The debris within the fluid has a larger mass than the fluid itself which, when acted on by centrifugal forces created by the swirling fluid, causes the debris to move away from the center of the vortex. This creates a situation in which relatively debris-free fluid is located near the center of the vortex and debris laden fluid is located near the walls of the centrifugal separation chamber 30.

A cylindrical vortex finder 60 extends through the dividing wall 26 and inside of the centrifugal separation chamber 30. The vortex finder 60 is positioned coaxially with the centrifugal separation chamber 30 and it extends to a position preferably within the cylindrical tube 38. The vortex finder 60 has an opening 62 which pulls in the relatively debris-free fluid near the center of the vortex while the debris laden fluid is allow to continue beyond the opening 62. As the fluid travels through tapered section 40, the increase in cross-sectional area causes the fluid to rotate slower. The debris within the fluid is pulled downward by gravity which causes the debris to pass through a hole 44 in dividing wall 46, and into a collection chamber 50. The collection chamber may be constructed to include a drain opening 52 and a discharge pipe 54 to help pull the debris into the collection chamber 50.

The vortex finder 60 carries the relatively debris-free fluid to an opening 64 in a filtration chamber 70. The filtration chamber 70 houses a filter element 72 which is used to extract the remaining unwanted debris from the fluid before it exits the cyclonic filter assembly 10. The fluid exits the cyclonic filter assembly 10 through an opening 74 connected to an outlet pipe 76. The filtration chamber 70 may include an opening 86 and a pipe 88 for installing a pressure gauge.

In the preferred embodiment of the present invention the filtration chamber 70 encircles the centrifugal separation chamber 30 in order to create a compact and effective filter unit. The filter element 72 used in the present invention 10 is a standard filter bag that not only acts as a filter element in the filtration chamber 70, but also extends into the collection chamber 50 to act as a debris collection bag. The filter element 72 is a unitary bag which is divided into two sections by dividing wall 46, which sits within the bag.

In the preferred embodiment the filter element 72 sits within a perforated filter basket 92. The filter basket 92 holds the filter element 72 away from the sides of the shell 80 and aids in the removal of the filter element 72. The shell 80 is manufactured with a ledge 90 upon which a lip 94 on the filter basket 92 rests. The dividing wall 26, which sits upon the lip 94 of the filter basket 92, is forced towards the ledge 90 by the pressure within the inlet chamber 20 and thereby creates a seal between the dividing wall 26, the lip 94, and the ledge 90.

The inlet chamber 20 has a cover 106 which may be quickly and easily removed for cleaning and replacement of the filter element 72. A rim 100 is rigidly attached to the top edge of the shell 80 by welding or other similar method. The cover 106 has a plurality of bolts 104 that extend therethrough and into the rim 100 to hold the cover 106 in place upon the shell 80. Preferably, the bolts 104 are held in position by mating nuts (not shown) in a conventional manner. An O-ring gasket 102 is positioned between the mating surfaces of the cover 106 and the rim 100 to prevent any leakage from the cyclonic filter assembly 10. The cover 106 may also be manufactured with a handle 108.

The cyclonic filter assembly 10 can be easily disassembled for cleaning and replacement of the filter element 72 by removing the cover 106. The dividing wall 26, the centrifugal separation chamber 30, the vortex finder 60, and the dividing wall 46 are preferably constructed as a first unit. The shell 80 acting as a separate unit that is removably connected to the first unit.

In order to clean the cyclonic filter assembly 10, the user would stop the flow of fluid to the cyclonic filter assembly 10 by closing a valve (not shown) upstream of the assembly 10. The user would then remove the plurality of bolts 104 and remove the cover 106 from the shell 80. The first unit, the filter element 72, and the filter basket 92 may then be removed from the shell 80. The filter bag 72 may then be either removed and replaced or cleaned and replaced. The cyclonic filter assembly 10 is then reassembled and the upstream valve is then opened and the cyclonic filter assembly 10 is checked for any leaks.

It is to be understood that the present invention is not limited to the embodiment described above, but encompasses any and all embodiments within the scope of the following claims.

I claim:

1. A cyclonic filter assembly, comprising:
    a centrifugal separation chamber having a cylindrical tube including an axis, a first end, a second end, and a first tapered tubular section, said first end being connected to a narrow end of said first tapered tubular section;

an inlet port located proximate said first tapered tubular section, said inlet port being oriented substantially tangential to said first tapered tubular section;

a collection chamber interconnected to said second end of said cylindrical tube;

a cylindrical vortex finder having a first portion and a second portion, said first portion extending through said first tapered tubular section and into said cylindrical tube, said first portion being coaxial with said cylindrical tube, said vortex finder having a channel therethrough;

a filtration chamber interconnected to said channel at said second portion of said vortex finder;

an opening from said filtration chamber; and a filter element within said filtration chamber, whereby a fluid passing from said channel to said opening must substantially pass through said filter element.

2. The cyclonic filter assembly as defined in claim 1, wherein said filtration chamber encircles said cylindrical tube.

3. The cyclonic filter assembly as defined in claim 1, wherein said filter element extends into said collection chamber.

4. The cyclonic filter assembly as defined in claim 3, further comprising a perforated filter basket coextensive with said filter element, said filter element being position inside said filter basket.

5. The cyclonic filter assembly as defined in claim 1, wherein said filter element is removable.

6. The cyclonic filter assembly as defined in claim 1, further comprising a second tapered tubular section having a narrow end and a broad end, said narrow end being connected to said second end of said cylindrical tube, and said broad end being interconnected to said collection chamber.

7. The cyclonic filter assembly as defined in claim 1, further comprising an inlet chamber interconnected to said inlet port, said inlet chamber having an inlet aperture therethrough.

8. The cyclonic filter assembly as defined in claim 1, wherein said collection chamber has an aperture therethrough.

9. A cyclonic filter assembly, comprising:

an shell having an inlet opening and an outlet opening, said shell also having an open end;

a cover removably attached to said open end of said shell;

a first dividing wall having a first side and an opposing second side and a hole therethrough, said first dividing wall being removably positioned within said shell;

an inlet chamber defined by said shell, said cover and said first side of said first dividing wall, said inlet opening being located on said inlet chamber;

a centrifugal separation chamber having a cylindrical tube attached to said first dividing wall, said cylindrical tube being positioned within said shell, said cylindrical tube including an axis, a first end, a second end, and a first tapered tubular section, said first end being connected to a narrow end of said first tapered tubular section;

an inlet port connected to said hole through said first dividing wall, said inlet port located proximate to said first tapered tubular section, said inlet port being oriented substantially tangential to said first tapered tubular section;

a cylindrical vortex finder connected to said first dividing wall and having a first portion and a second portion, said first portion extending through said first tapered tubular section and into said cylindrical tube, said first portion being coaxial with said cylindrical tube, said vortex finder having a channel therethrough;

a second dividing wall having a first side and an opposing second side and a hole therethrough, said hole of said second dividing wall being interconnected to said second end of said cylindrical tube;

a filtration chamber defined by said shell, said second side of said first dividing wall, said first side of said second dividing wall and said cylindrical tube, said filtration chamber being interconnected to said channel at said second portion of said vortex finder, said outlet opening being interconnected to said filtration chamber;

a collection chamber defined by said shell and said second side of said dividing wall; and a filter element within said filtration chamber, whereby a fluid passing from said channel to said outlet opening must substantially pass through said filter element.

10. The cyclonic filter assembly as defined in claim 9, wherein said filter element is removable.

11. The cyclonic filter assembly as defined in claim 9, wherein said filter element extends beyond said second dividing wall into said collection chamber.

12. The cyclonic filter assembly as defined in claim 11, further comprising a perforated filter basket coextensive with said filter element, said filter element being position inside said filter basket.

13. The cyclonic filter assembly as defined in claim 12, wherein:

said filter basket has an outwardly extending lip; and said shell has an inwardly extending ledge, whereby said lip rests upon said ledge and said first dividing wall rests upon said lip, said fluid pressure within said inlet chamber creating a seal between said first dividing wall, said filter basket, and said shell.

14. The cyclonic filter assembly as defined in claim 13, wherein:

said first dividing wall, said cylindrical tube, said inlet port, said cylindrical vortex finder, and said second dividing wall form a rigid unit; and said unit, said filter element, and said filter basket being removable from said shell.

15. The cyclonic filter assembly as defined in claim 9, further comprising a second tapered tubular section having a narrow end and a broad end, said narrow end being connected to said second end of said cylindrical tube, and said broad end being connected to said hole through said second dividing wall.

16. The cyclonic filter assembly as defined in claim 9, wherein said collection chamber has an aperture therethrough.

17. The cyclonic filter assembly as defined in claim 9, said cover having a handle thereon.

18. The cyclonic filter assembly as defined in claim 9, said inlet chamber having a pressure gauge connected thereto.

19. The cyclonic filter assembly as defined in claim 9, said filtration chamber having a pressure gauge connected thereto.

* * * * *